(12) United States Patent
Zhu et al.

(10) Patent No.: US 10,341,569 B2
(45) Date of Patent: *Jul. 2, 2019

(54) METHOD AND APPARATUS FOR VARYING FOCAL LENGTH OF CAMERA DEVICE, AND CAMERA DEVICE

(71) Applicant: TENCENT TECHNOLOGY (SHENZHEN) COMPANY LIMITED, Shenzhen (CN)

(72) Inventors: Chen Zhu, Shenzhen (CN); Cheng Wang, Shenzhen (CN); Cheng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,502

(22) Filed: Dec. 19, 2017

(65) Prior Publication Data

US 2018/0109721 A1    Apr. 19, 2018

Related U.S. Application Data

(63) Continuation of application No. 14/678,902, filed on Apr. 3, 2015, now Pat. No. 9,883,094, which is a (Continued)

(30) Foreign Application Priority Data

Oct. 10, 2012  (CN) .......................... 2012 1 0382113

(51) Int. Cl.
*G06F 3/041*     (2006.01)
*H04N 5/232*    (2006.01)
(Continued)

(52) U.S. Cl.
CPC ......... *H04N 5/23296* (2013.01); *G06F 3/041* (2013.01); *G06F 3/0488* (2013.01);
(Continued)

(58) Field of Classification Search
CPC ......... H04N 5/23212; H04N 5/232127; H04N 5/23216; H04N 5/232933; H04N 5/23296;
(Continued)

(56) References Cited

U.S. PATENT DOCUMENTS 7,089,507 B2      8/2006   Lection et al.
2010/0073303 A1*  3/2010   Wu ....................... G06F 3/0485
                                                               345/173
(Continued)

FOREIGN PATENT DOCUMENTS

CN     101667089 A     3/2010
CN     101901107 A    12/2010
(Continued)

*Primary Examiner* — Daniel M Pasiewicz
(74) *Attorney, Agent, or Firm* — Anova Law Group, PLLC

(57) ABSTRACT

The present disclosure discloses a method and an apparatus for varying a focal length of a camera device, and a camera device capable of varying a focal length thereof. The method includes: obtaining a position where one finger of a user touches a touch screen of the camera device; obtaining an image zooming multiple according to a distance and a direction that the finger of the user slides on the touch screen of the camera device; and zooming, according to the image zooming multiple and by using the position on the touch screen of the camera device where the finger of the user touches the touch screen of the camera device as a center, an image currently taken by the camera device, so as to vary a (Continued)

focal length of the camera device. The apparatus includes: a first obtaining module, a second obtaining module, and a zooming module.

17 Claims, 15 Drawing Sheets

Related U.S. Application Data continuation of application No. PCT/CN2013/084954, filed on Oct. 10, 2013.

(51) Int. Cl.
*G06F 3/0484* (2013.01)
*G06F 3/0488* (2013.01)

(52) U.S. Cl.
CPC ...... *G06F 3/04847* (2013.01); *G06F 3/04883* (2013.01); *H04N 5/23212* (2013.01); *H04N 5/23216* (2013.01); *H04N 5/232127* (2018.08); *H04N 5/232933* (2018.08); *G06F 2203/04806* (2013.01)

(58) Field of Classification Search
CPC ............... G06F 3/04847; G06F 3/0488; G06F 2203/04807
See application file for complete search history.

(56) References Cited

U.S. PATENT DOCUMENTS

| | | | |
|---|---|---|---|
| 2010/0097322 A1* | 4/2010 | Hu | G06F 3/04883 345/173 |
| 2010/0156806 A1 | 6/2010 | Stallings | |
| 2011/0013049 A1* | 1/2011 | Thorn | G06F 3/0488 348/240.3 |
| 2011/0109581 A1* | 5/2011 | Ozawa | G06F 3/0481 345/173 |
| 2011/0115947 A1* | 5/2011 | Oh | G06F 3/0481 348/240.99 |
| 2012/0284674 A1* | 11/2012 | Geng | G06F 3/04883 715/863 |
| 2013/0033448 A1 | 2/2013 | Yano et al. | |
| 2014/0192244 A1* | 7/2014 | Ishihara | G06F 3/04845 348/333.02 |

FOREIGN PATENT DOCUMENTS

| | | | |
|---|---|---|---|
| CN | 101963860 A | | 2/2011 |
| CN | 102084327 A | | 6/2011 |
| CN | 102460364 A | | 5/2012 |
| CN | 102566908 A | | 7/2012 |
| JP | 2011234008 A | * | 11/2011 |
| JP | 2011234008 A | | 11/2011 |

* cited by examiner

METHOD AND APPARATUS FOR VARYING FOCAL LENGTH OF CAMERA DEVICE, AND CAMERA DEVICE

This application is a continuation application of U.S. patent application Ser. No. 14/678,902, filed on Apr. 3, 2015. U.S. patent application Ser. No. 14/678,902 is a continuation of PCT Application No. PCT/CN2013/084954, filed on Oct. 10, 2013, which claims priority to Chinese Patent Application No. 201210382113.3, filed on Oct. 10, 2012, all of which are incorporated herein by reference in their entirety.

FIELD OF THE TECHNOLOGY

The present disclosure relates to the field of computer technology, and in particular, relates to a method and an apparatus for varying a focal length of a camera device, and a camera device capable of varying a focal length thereof.

BACKGROUND OF THE DISCLOSURE

With the rapid development of mobile phone technologies, a mobile phone increasingly includes more functions, for example, a camera may be integrated on the mobile phone so that the mobile phone has a camera function.

Referring to FIG. 1, when a user uses a camera function included in a mobile phone to take an image, if the user needs to vary a focal length of a camera of the mobile phone, the user can use two fingers of one hand to make a stretch or pinch gesture on a touch screen of the mobile phone, so as to vary the focal length of the camera of the mobile phone. For example, two fingers of the user make a stretch gesture on the touch screen to lengthen the focal length of the camera of the mobile phone, or make a pinch gesture on the touch screen to shorten the focal length of the camera of the mobile phone. Assuming that the user makes a stretch gesture on a touch screen shown in FIG. 1 to lengthen the focal length of the camera of the mobile phone, an image taken by the camera of the mobile phone and shown in FIG. 1 is zoomed in as an image shown in FIG. 2.

Currently, the user at least uses one hand to hold the mobile phone to take images, and needs to use the other hand alone to make a stretch or pinch gesture on the touch screen of the mobile phone to vary the focal length of the camera of the mobile phone, which has poor operation convenience.

SUMMARY

In order to improve operation convenience for varying a focal length of a camera device, the present disclosure provides a method and an apparatus for varying a focal length of a camera device, and a camera device capable of varying a focal length thereof. The technical solutions are as follows.

A method for varying a focal length of a camera device is provided by obtaining a position where one finger of a user touches a touch screen of the camera device; obtaining an image zooming multiple according to a distance and a direction that the finger of the user slides on the touch screen of the camera device; and zooming, according to the image zooming multiple and by using the position where the finger of the user touches the touch screen of the camera device as a center, an image currently taken by the camera device, so as to vary a focal length of the camera device.

An apparatus for varying a focal length of a camera device is provided, including: a first obtaining module, configured to obtain a position where one finger of a user touches a touch screen of the camera device; a second obtaining module, configured to obtain an image zooming multiple according to a distance and a direction that the finger of the user slides on the touch screen of the camera device; and a zooming module, configured to zoom, according to the image zooming multiple and by using the position where the finger of the user touches the touch screen of the camera device as a center, an image currently taken by the camera device, so as to vary a focal length of the camera device.

A camera device is provided, including a memory, one or more processors, and one or more program instructions stored in the memory and configured to be executed by the one or more processors. The one or more program instructions includes a position obtaining instruction, configured to obtain a position where one finger of a user touches a touch screen of the camera device; a zoom obtaining instruction, configured to obtain an image zooming multiple according to a distance and a direction that the finger of the user slides on the touch screen of the camera device; and a zooming instruction, configured to zoom, according to the image zooming multiple and by using the position where the finger of the user touches the touch screen of the camera device as a center, an image currently taken by the camera device, so as to vary a focal length of the camera device.

In embodiments of the present invention, a position at which/where one finger of a user touches a touch screen of a camera device is obtained; an image zooming multiple is obtained according to a distance for which/that the finger of the user slides on the touch screen of the camera device and a direction in which/that the finger of the user slides on the touch screen of the camera device; and an image currently taken by the camera device is zoomed according to the image zooming multiple and by using the position at which the finger of the user touches the touch screen of the camera device as a center, so as to vary a focal length of the camera device.

In this way, a user can use one finger of a hand that holds a camera device, to touch and slide on a touch screen of the camera device to vary a focal length of the camera device, thereby improving operation convenience.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure. The embodiments of the present invention are described below with reference to the accompanying drawings. In these accompanying drawings.

DESCRIPTION OF EMBODIMENTS

In order to make the technical solutions of the present disclosure clearer, implementation manners of the present disclosure are further described below in detail with reference to the accompanying drawings.

Exemplary Embodiment 1

Figure 1:
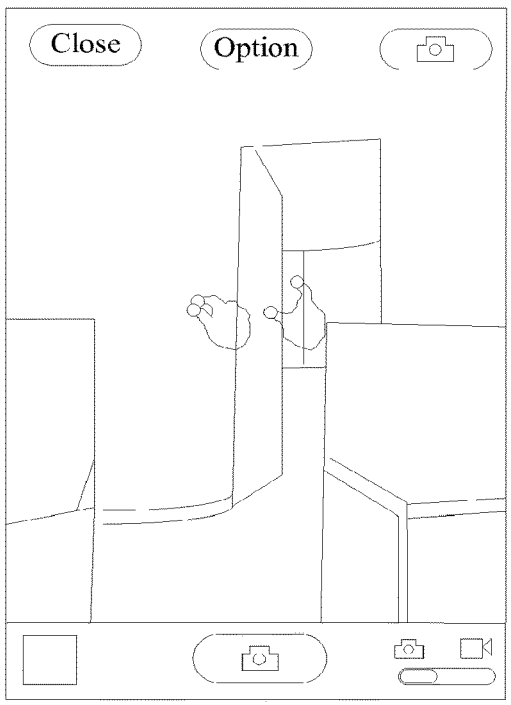
FIG. 1 is a schematic diagram of varying a focal length in the existing technology.
Figure 2:
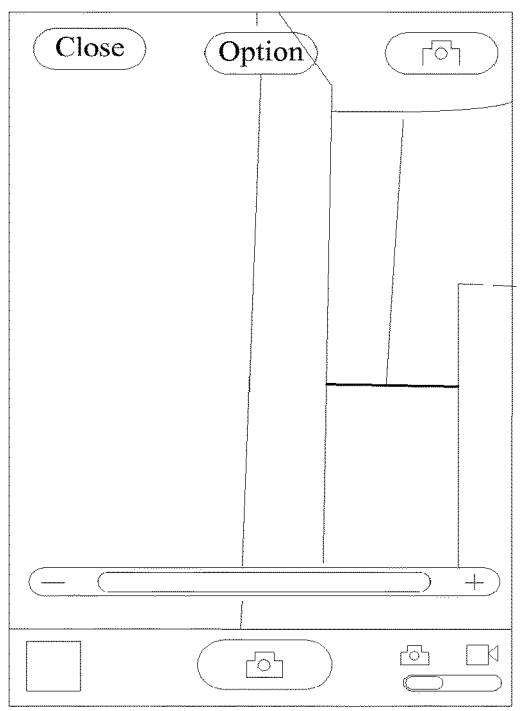
FIG. 2 is a schematic diagram of lengthening a focal length in the existing technology.
Figure 3:
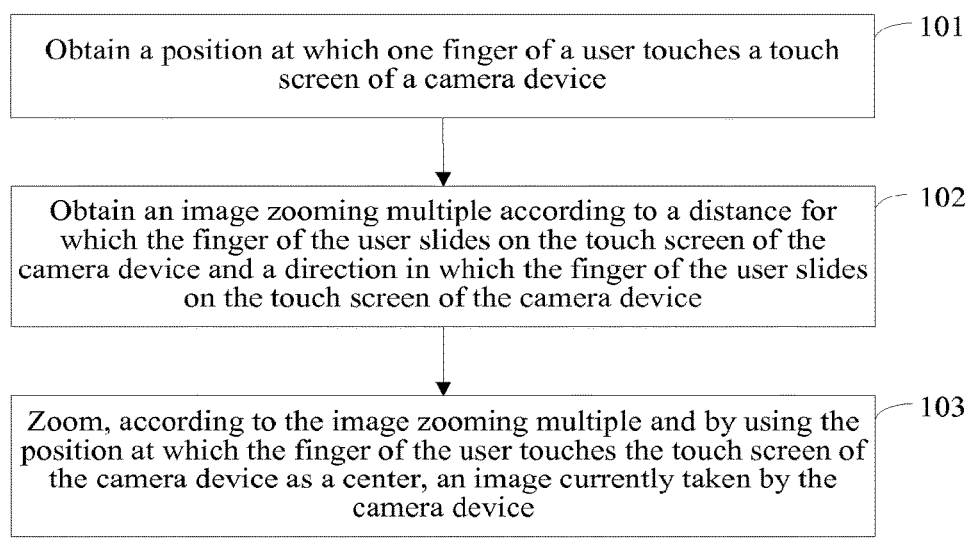
FIG. 3 is a flowchart of a method for transforming a focal length of a camera device according to exemplary Embodiment 1 of the present invention.

As shown in FIG. 3, this embodiment of the present invention provides a method for varying a focal length of a camera device, including: Step 101: obtaining a position at which (or where) one finger of a user touches a touch screen of a camera device, Step 102: obtaining an image zooming multiple according to a distance for which (or that) the finger of the user slides on the touch screen of the camera device and a direction in which (or that) the finger of the user slides on the touch screen of the camera device, and Step 103: zooming, according to the image zooming multiple and by using the position at which (or where) the finger of the user touches the touch screen of the camera device as a center, an image currently taken by the camera device, so as to vary a focal length of the camera device.

In this embodiment of the present invention, a position at which one finger of a user touches a touch screen of a camera device is obtained; an image zooming multiple is obtained according to a distance for which the finger of the user slides on the touch screen of the camera device and a direction in which the finger of the user slides on the touch screen of the camera device; and an image currently taken by the camera device is zoomed according to the image zooming multiple and by using the position at which the finger of the user touches the touch screen of the camera device as a center, so as to vary a focal length of the camera device. In this way, a user can use one finger of a hand that holds a camera device, to touch and slide on a touch screen of the camera device to vary a focal length of the camera device, thereby improving operation convenience.

Exemplary Embodiment 2

Figure 4:
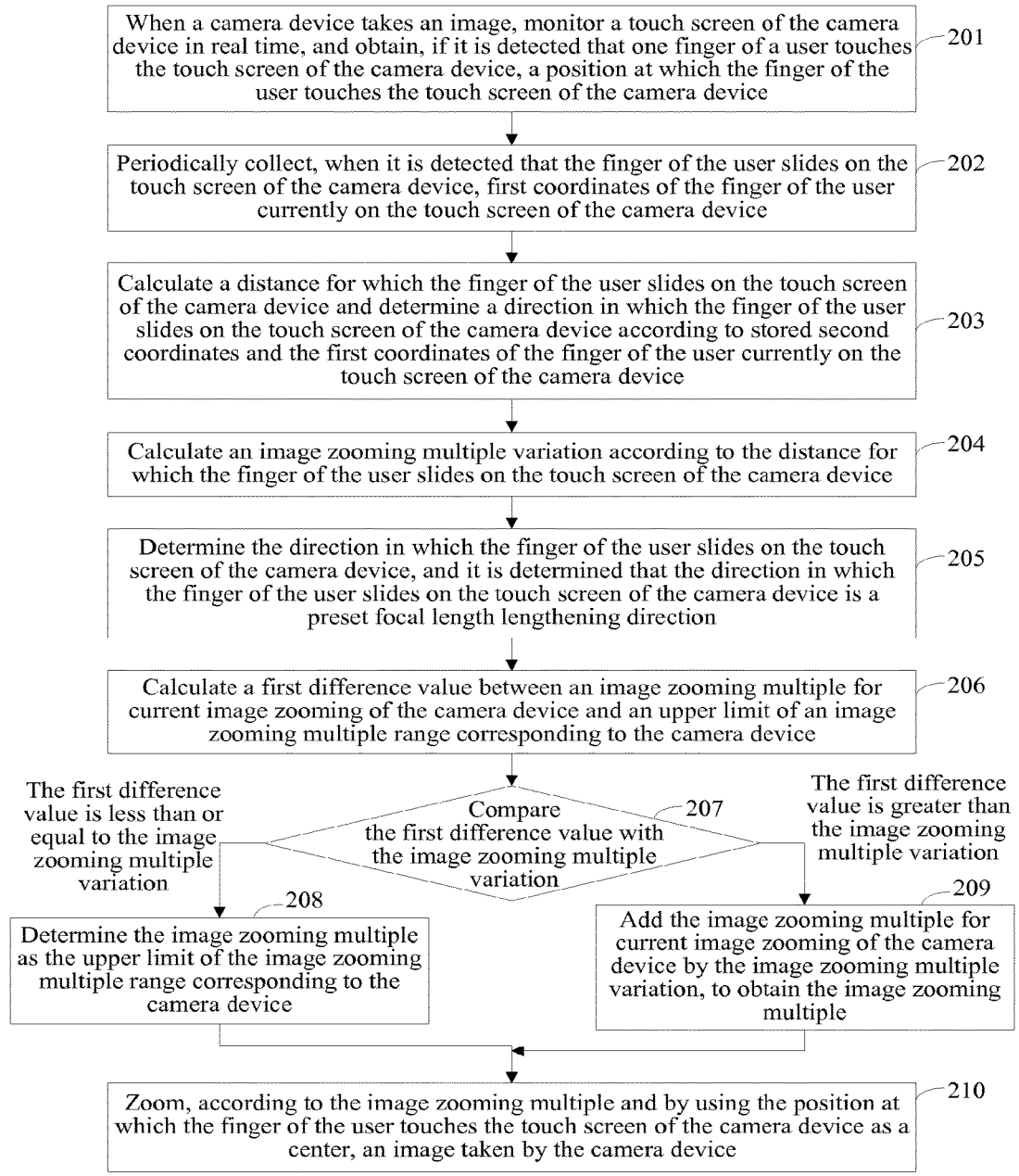
FIG. 4 is a flowchart of a method for varying a focal length of a camera device according to exemplary Embodiment 2 of the present invention.

This embodiment of the present invention provides a method for varying a focal length of a camera device. In this embodiment, when using a camera device to take an image, a user needs to lengthen a focal length of the camera device. The user can lengthen the focal length of the camera device by using the method of this embodiment. Referring to FIG. 4, the method may include:

Step 201: includes, when a camera device takes an image, monitoring a touch screen of the camera device in real time, and obtain, if it is detected that one finger of a user touches the touch screen of the camera device, a position on the camera device at which the finger of the user touches the touch screen of the camera device.

The camera device at least includes a touch screen and a camera lens, and the camera device takes an image by using the camera lens and displays the currently taken image on the touch screen of the camera device.

The camera device corresponds to one image zooming multiple range. When an image is taken, the camera device may zoom the currently taken image according to an image zooming multiple included in the image zooming multiple range corresponding to the camera device, and then displays the zoomed image on the touch screen of the camera device.

The camera device may be, for example, a mobile phone having a camera function, a camera, or a video camera.

In this embodiment, assuming that the user needs to lengthen a focal length of the camera device, the user uses one finger of its own to touch the touch screen of the camera device and slides in a preset focal length lengthening direction.

Step 202: includes periodically collecting, when it is detected that the finger of the user slides on the touch screen of the camera device, first coordinates of the finger of the user currently on the touch screen of the camera device.

If it is detected that the finger of the user just touches the touch screen of the camera device, second coordinates of the finger of the user on the touch screen of the camera device are collected, and the collected second coordinates are stored; and meanwhile, a timer is set to start timing; and if a counted time reaches a preset period length, first coordinates of the finger of the user currently on the touch screen of the camera device are collected, and the timer is set to start timing anew.

Figure 5:
FIG. 5 is a schematic diagram of lengthening a focal length according to exemplary Embodiment 2 of the present invention.

For example, referring to FIG. 5, the finger of the user touches the touch screen of the camera device and starts to slide upwards; correspondingly, when it is detected that the finger of the user touches the touch screen of the camera device, the second coordinates of the finger of the user on the touch screen of the camera device are collected to be (5, 5); and meanwhile, a timer is set for timing. During a process in which the finger of the user slides on the touch screen of the camera device, when a time counted by the timer reaches a preset period length, the first coordinates of the finger of the user currently on the touch screen of the camera device are collected to be (5, 3), and meanwhile, the timer is set to start timing anew.

Step 203: includes calculating a distance for which the finger of the user slides on the touch screen of the camera device and determine a direction in which the finger of the user slides on the touch screen of the camera device, according to the stored second coordinates and the first coordinates of the finger of the user currently on the touch screen of the camera device.

Further, the stored second coordinates are updated as the first coordinates of the finger of the user currently on the touch screen of the camera device.

For example, the distance for which the finger of the user slides on the touch screen of the camera device is calculated to be 2 and the direction in which the finger of the user slides on the touch screen of the camera device is determined to be an upward direction, according to the stored second coordinates (5, 5) and the first coordinates (5, 3) of the finger of the user currently on the touch screen of the camera device; and the stored second coordinates are updated as the first coordinates (5, 3) of the finger of the user currently on the touch screen of the camera device.

Step 204: includes calculating an image zooming multiple variation according to the distance for which the finger of the user slides on the touch screen of the camera device.

Specifically, the distance for which the finger of the user slides on the touch screen of the camera device is multiplied by a preset image zooming coefficient, to obtain the image zooming multiple variation.

For example, assuming that the preset image zooming coefficient is 1.5, the distance 2 for which the finger of the user slides on the touch screen of the camera device is multiplied by the preset image zooming coefficient 1.5, to obtain the image zooming multiple variation as 3.

Step 205: includes determining the direction in which the finger of the user slides on the touch screen of the camera device, and, when it is determined that the direction in which the finger of the user slides on the touch screen of the camera device is a preset focal length lengthening direction, Step 206 is performed The preset focal length lengthening direction may be an upward direction, a downward direction, a left direction, or a right direction; and correspondingly, there is also a preset focal length shortening direction, where the preset focal length shortening direction may be an upward direction, a downward direction, a left direction, or a right direction. Moreover, if the preset focal length lengthening direction is an upward direction, the preset focal length shortening direction is a downward direction; if the preset focal length lengthening direction is a downward direction, the preset focal length shortening direction is an upward direction; if the preset focal length lengthening direction is a left direction, the preset focal length shortening direction is a right direction; and if the preset focal length lengthening direction is a right direction, the preset focal length shortening direction is a left direction.

For example, assuming that the preset focal length lengthening direction is an upward direction, the direction in which the finger of the user slides on the touch screen of the camera device is an upward direction is determined, and when it is determined that the direction in which the finger of the user slides on the touch screen of the camera device is the preset focal length lengthening direction, the following Step 206 is performed.

Step 206: includes calculating a first difference value between an image zooming multiple for current image zooming of the camera device and an upper limit of an image zooming multiple range corresponding to the camera device.

The camera device stores one image zooming multiple for current image zooming. Each time the camera device takes an image, the camera device zooms the currently taken image according to the stored image zooming multiple for current image zooming.

For example, assuming that the image zooming multiple for current image zooming and stored in the camera device is 5, and the image zooming multiple range corresponding to the camera device is greater than or equal to 2 and less than or equal to 15, the first difference value between the image zooming multiple 5 for current image zooming of the camera device and the upper limit 15 of the image zooming multiple range corresponding to the camera device is calculated to be 10.

Step 207: includes comparing the first difference value with the image zooming multiple variation; and performing Step 208 if the first difference value is less than or equal to the image zooming multiple variation, and performing Step 209 if the first difference value is greater than the image zooming multiple.

Step 208: includes determining the image zooming multiple as the upper limit of the image zooming multiple range corresponding to the camera device, and performing Step 210.

Step 209: includes adding the image zooming multiple for current image zooming of the camera device by the image zooming multiple variation, to obtain the image zooming multiple.

For example, the first difference value 10 is compared with the image zooming multiple variation 3, and if it is obtained by comparison that the first difference value is greater than the image zooming multiple variation, the image zooming multiple 5 for current image zooming of the camera device is added by the image zooming multiple variation 3, to obtain the image zooming multiple as 8.

Step 210: includes zooming, according to the image zooming multiple and by using the position at which the finger of the user touches the touch screen of the camera device as a center, an image taken by the camera device, so as to vary a focal length of the camera device.

Specifically, the image zooming multiple for current image zooming and stored in the camera device is updated as the image zooming multiple, and the image taken by the camera device is zoomed in according to the image zooming multiple and by using the position at which the finger of the user touches the touch screen of the camera device as a center, so as to lengthen the focal length of the camera device.

Figure 6:
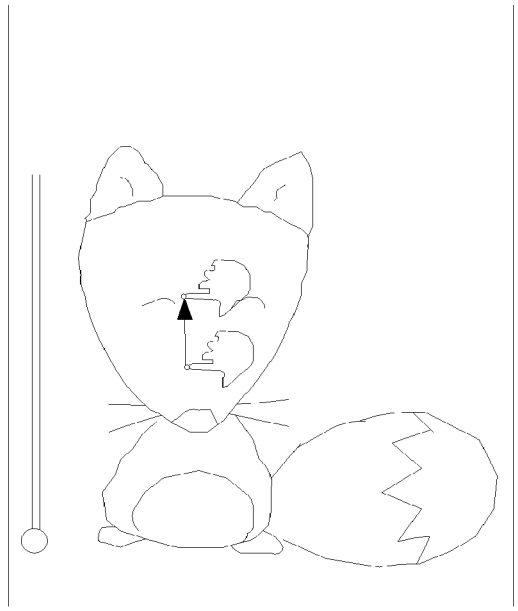
FIG. 6 is a schematic diagram of lengthening a focal length to zoom in an image according to exemplary Embodiment 2 of the present invention.

For example, the image shown in FIG. 5 and taken by the camera device is zoomed in according to the image zooming multiple 8 and by using the position at which the finger of the user touches the touch screen of the camera device as a center, to obtain a zoomed-in image shown in FIG. 6, so as to lengthen the focal length of the camera device.

Figure 7:
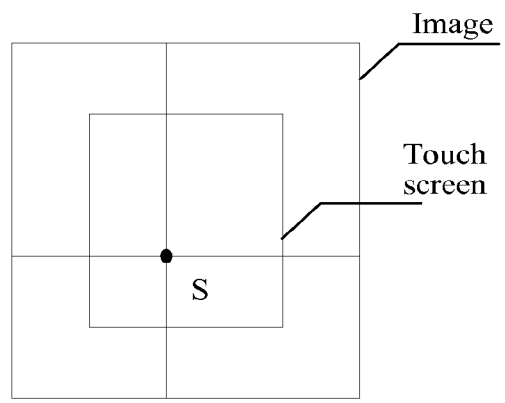
FIG. 7 is a schematic diagram of an image taken by a camera device according to exemplary Embodiment 2 of the present invention.
Figure 8:
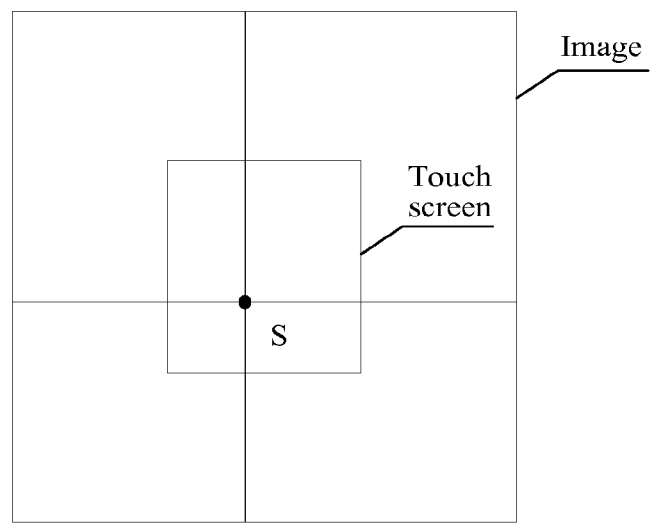
FIG. 8 is a schematic diagram of a zoomed-in image according to exemplary Embodiment 2 of the present invention.

For another example, referring to FIG. 7, the position at which the finger of the user touches the touch screen of the camera device is a position S, and the image taken by the camera device is zoomed in according to the image zooming multiple and by using the position S where the finger of the user touches the touch screen of the camera device as a center, to obtain a zoomed-in image shown in FIG. 8.

When the first coordinates of the finger of the user currently on the touch screen of the camera device are collected during a next period, go back to Step 202 to start operation, and if it is detected that the finger of the user leaves the touch screen of the camera device, end operation.

In this embodiment of the present invention, when a camera device takes an image, if it is detected that one finger of a user touches a touch screen of the camera device and slides, a distance for which the finger of the user slides on the touch screen of the camera device and a direction in which the finger of the user slides on the touch screen of the camera device are periodically collected, an image zooming multiple is obtained according to the distance for which the finger of the user slides on the touch screen of the camera device and the direction in which the finger of the user slides on the touch screen of the camera device, and the image currently taken by the camera device is zoomed according to the image zooming multiple and by using a position at which the finger of the user touches the touch screen of the camera device as a center, so as to vary a focal length of the camera device. In this way, a user can use one finger of a hand that holds a camera device, to touch and slide on a touch screen of the camera device to vary a focal length of the camera device, thereby improving operation convenience.

Exemplary Embodiment 3

Figure 9:
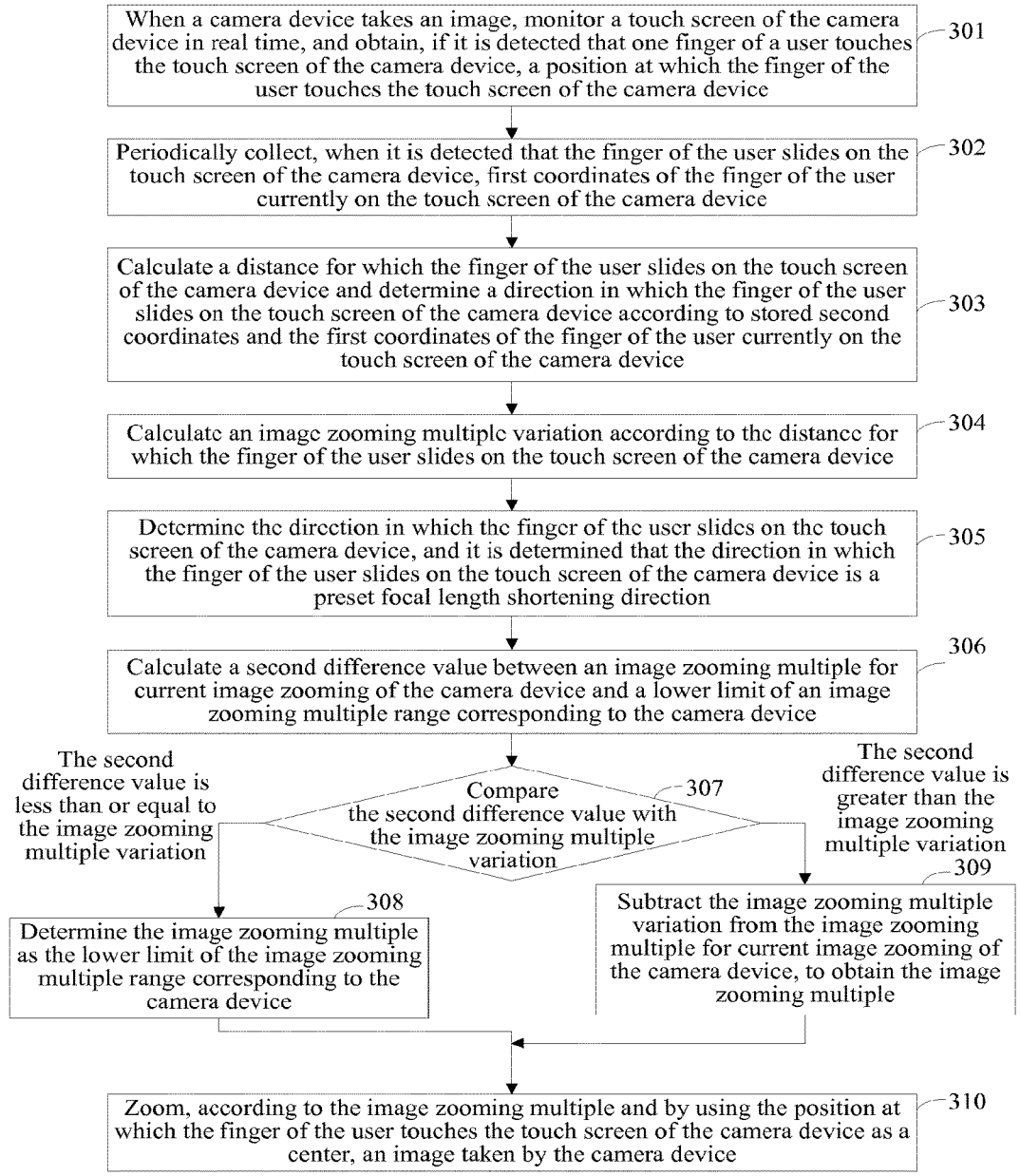
FIG. 9 is a flowchart of a method for varying a focal length of a camera device according to exemplary Embodiment 3 of the present invention.

This embodiment of the present invention provides a method for varying a focal length of a camera device. In this embodiment, when using a camera device to take an image, a user needs to shorten a focal length of the camera device. The user can shorten the focal length of the camera device by using the method of this embodiment. Referring to FIG. 9, the method may include:

Step 301: includes, when a camera device takes an image, monitoring a touch screen of the camera device in real time, and obtaining, if it is detected that one finger of a user touches the touch screen of the camera device, a position at which the finger of the user touches the touch screen of the camera device.

Step 301 is similar to Step 201, and is not described again herein.

In this embodiment, assuming that the user needs to shorten a focal length of the camera device, the user uses one finger of its own to touch the touch screen of the camera device and slides in a preset focal length shortening direction.

Correspondingly, when it is detected that the finger of the user touches the touch screen of the camera device, the following Step 302 is performed.

Step 302: includes periodically collecting, when it is detected that the finger of the user slides on the touch screen of the camera device, first coordinates of the finger of the user currently on the touch screen of the camera device.

Step 302 is similar to Step 202, and is not described again herein.

Figure 10:
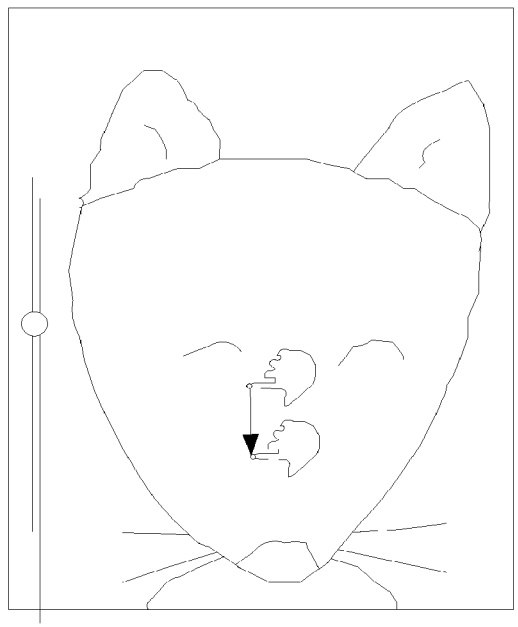
FIG. 10 is a schematic diagram of shortening a focal length according to exemplary Embodiment 3 of the present invention.

For example, referring to FIG. 10, the finger of the user touches the touch screen of the camera device and starts to slide downwards; correspondingly, when it is detected that the finger of the user touches the touch screen of the camera device, second coordinates of the finger of the user on the touch screen of the camera device are collected to be (10, 10); and meanwhile, a timer is set for timing. During a process in which the finger of the user slides on the touch screen of the camera device, when a time counted by the timer reaches a preset period length, the first coordinates of the finger of the user currently on the touch screen of the camera device are collected to be (10, 8), and meanwhile, the timer is set to start timing anew.

Step 303: includes calculating a distance for which the finger of the user slides on the touch screen of the camera device and determining a direction in which the finger of the user slides on the touch screen of the camera device, according to the stored second coordinates and the first coordinates of the finger of the user currently on the touch screen of the camera device.

Step 303 is similar to Step 203, and is not described again herein.

For example, the distance for which the finger of the user slides on the touch screen of the camera device is calculated to be 2 and the direction in which the finger of the user slides on the touch screen of the camera device is determined to be a downward direction, according to the stored second coordinates (10, 10) and the first coordinates (10, 8) of the finger of the user currently on the touch screen of the camera device; and the stored second coordinates are updated as the first coordinates (10, 8) of the finger of the user currently on the touch screen of the camera device.

Step 304: includes calculating an image zooming multiple variation according to the distance for which the finger of the user slides on the touch screen of the camera device.

Step 304 is similar to Step 204, and is not described again herein.

For example, assuming that a preset image zooming coefficient is 1.5, the distance 2 for which the finger of the user slides on the touch screen of the camera device is multiplied by the preset image zooming coefficient 1.5, to obtain the image zooming multiple variation as 3.

Step 305: includes determining the direction in which the finger of the user slides on the touch screen of the camera device, and, when it is determined that the direction in which the finger of the user slides on the touch screen of the camera device is a preset focal length shortening direction, performing Step 306.

The preset focal length shortening direction may be an upward direction, a downward direction, a left direction, or a right direction; and correspondingly, there is also a preset focal length lengthening direction, where the preset focal length lengthening direction may be an upward direction, a downward direction, a left direction, or a right direction. Moreover, if the preset focal length shortening direction is an upward direction, the preset focal length lengthening direction is a downward direction; if the preset focal length shortening direction is a downward direction, the preset focal length lengthening direction is an upward direction; if the preset focal length shortening direction is a left direction, the preset focal length lengthening direction is a right direction; and if the preset focal length shortening direction is a right direction, the preset focal length lengthening direction is a left direction.

For example, assuming that the preset focal length shortening direction is a downward direction, the direction in which the finger of the user slides on the touch screen of the camera device is a downward direction is determined, and, when it is determined that the direction in which the finger of the user slides on the touch screen of the camera device is the preset focal length shortening direction, the following Step 306 is performed.

Step 306: includes calculating a second difference value between an image zooming multiple for current image zooming of the camera device and a lower limit of an image zooming multiple range corresponding to the camera device.

Step 306 is similar to Step 206, and is not described again herein.

For example, assuming that the image zooming multiple for current image zooming and stored in the camera device is 10, and the image zooming multiple range corresponding to the camera device is greater than or equal to 2 and less than or equal to 15, the second difference value between the image zooming multiple 10 for current image zooming of the camera device and the lower limit 2 of the image zooming multiple range corresponding to the camera device is calculated to be 8.

Step 307: includes comparing the second difference value with the image zooming multiple variation; and performing Step 308 if the second difference value is less than or equal to the image zooming multiple variation, and performing Step 309 if the second difference value is greater than the image zooming multiple.

Step 308: includes determining the image zooming multiple as the lower limit of the image zooming multiple range corresponding to the camera device, and performing Step 310.

Step 309: includes subtracting the image zooming multiple variation from the image zooming multiple for current image zooming of the camera device, to obtain the image zooming multiple.

For example, the second difference value 8 is compared with the image zooming multiple variation 3, and if it is obtained by comparison that the second difference value is greater than the image zooming multiple variation, the image zooming multiple variation 3 is subtracted from the image zooming multiple 10 for current image zooming of the camera device, to obtain the image zooming multiple as 7.

Step 310: includes zooming, according to the image zooming multiple and by using the position at which the finger of the user touches the touch screen of the camera device as a center, an image taken by the camera device, so as to vary a focal length of the camera device.

Step 310 is similar to Step 210, and is not described again herein.

Figure 11:
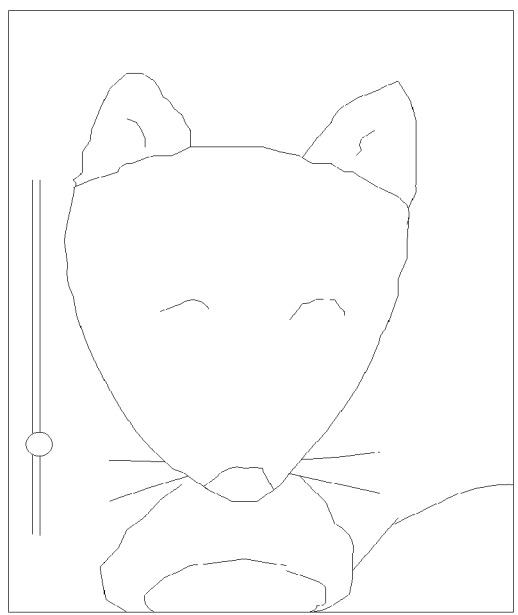
FIG. 11 is a schematic diagram of shortening a focal length to zoom out an image according to exemplary Embodiment 3 of the present invention.

For example, the image shown in FIG. 10 and taken by the camera device is zoomed out according to the image zooming multiple 7 and by using the position at which the finger of the user touches the touch screen of the camera device as a center, to obtain a zoomed-out image shown in FIG. 11, so as to shorten the focal length of the camera device. That the image taken by the camera device is zoomed according to the image zooming multiple and by using the position at which the finger of the user touches the touch screen of the camera device as a center may specifically be:

If a boundary of the image currently taken by the camera device does not overlap with a boundary of the touch screen of the camera device, the image taken by camera device is zoomed out according to the image zooming multiple and by directly using the position at which the finger of the user touches the touch screen of the camera device as a center.

Figure 12:
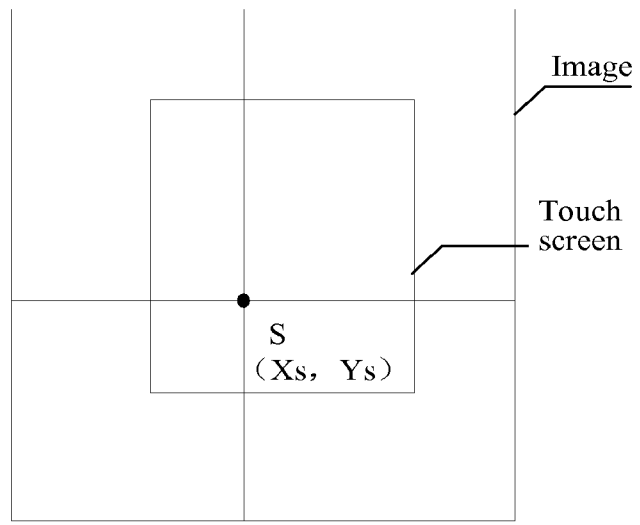
FIG. 12 is a schematic diagram of an image taken by a camera device according to exemplary Embodiment 3 of the present invention.
Figure 13:
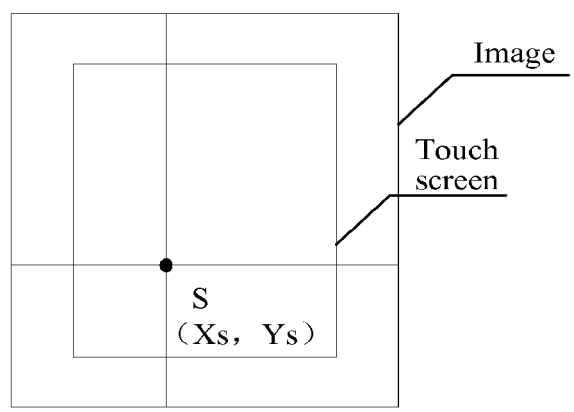
FIG. 13 is a schematic diagram of a zoomed-out image according to exemplary Embodiment 3 of the present invention.

For example, referring to FIG. 12, the position at which the finger of the user touches the touch screen of the camera device is a position S, and coordinates of the position S are (Xs, Ys). The image taken by the camera device is zoomed out according to the image zooming multiple and by directly using the position S where the finger of the user touches the touch screen of the camera device as a center, to obtain a zoomed-out image shown in FIG. 13.

When origin coordinates of a coordinate system that exists in the camera device are at a top-left corner of the touch screen of the camera device, that the image taken by camera device is zoomed according to the image zooming multiple and by using the position at which the finger of the user touches the touch screen of the camera device as a center may specifically be:

If a left boundary of the image currently taken by the camera device overlaps with a left boundary of the touch screen of the camera device, a horizontal coordinate of the position at which the finger of the user touches the touch screen of the camera device is set to zero, and the image currently taken by camera device is zoomed out according to the image zooming multiple and by using the position at which the finger of the user touches the touch screen of the camera device as a center.

Figure 14:
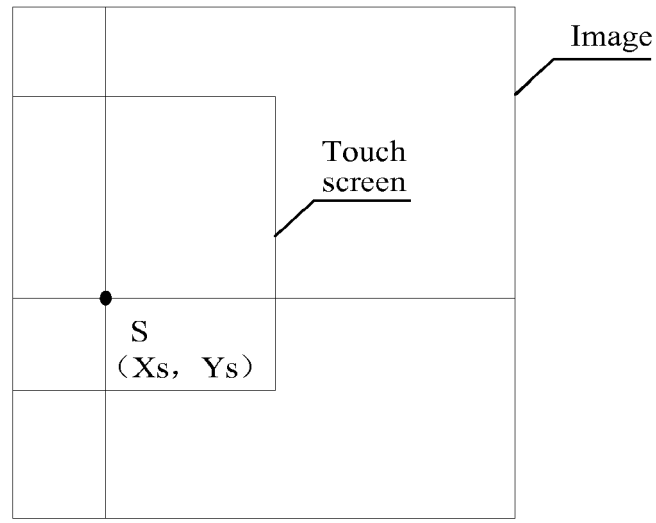
FIG. 14 is a schematic diagram in which a left boundary of an image overlaps with a left boundary of a touch screen according to exemplary Embodiment 3 of the present invention.
Figure 15:
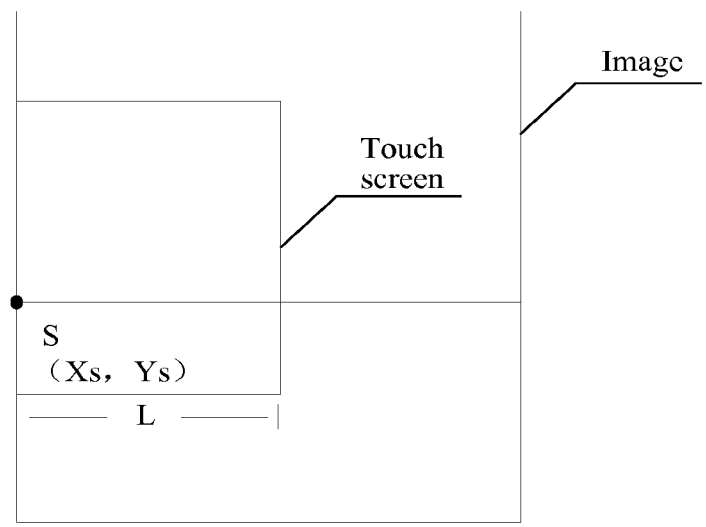
FIG. 15 is a schematic diagram of varying a position at which a user touches a touch screen, when a left boundary of an image overlaps with a left boundary of the touch screen according to exemplary Embodiment 3 of the present invention.
Figure 16:
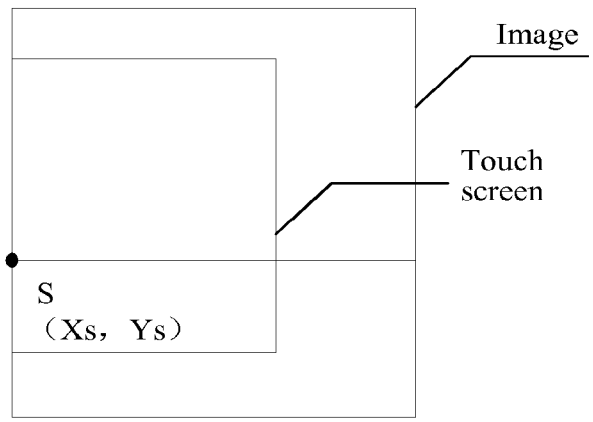
FIG. 16 is a schematic diagram of zooming out an image when a left boundary of the image overlaps with a left boundary of a touch screen according to exemplary Embodiment 3 of the present invention.

For example, referring to FIG. 14, the left boundary of the image currently taken by the camera device overlaps with the left boundary of the touch screen of the camera device, and a horizontal coordinate Xs of the position S where the finger of the user touches the touch screen of the camera device is set to zero. Referring to FIG. 15, the coordinates (Xs, Ys) of the position S where the finger of the user touches the touch screen of the camera device are obtained to be (0, Ys). The image currently taken by the camera device is zoomed out according to the image zooming multiple and by using the position S where the finger of the user touches the touch screen of the camera device as a center, to obtain a zoomed-out image shown in FIG. 16.

If a right boundary of the image currently taken by the camera device overlaps with a right boundary of the touch screen of the camera device, a horizontal coordinate of the position at which the finger of the user touches the touch screen of the camera device is set as a width of the touch screen of the camera device, and the image currently taken by camera device is zoomed out according to the image zooming multiple and by using the position at which the finger of the user touches the touch screen of the camera device as a center.

Figure 17:
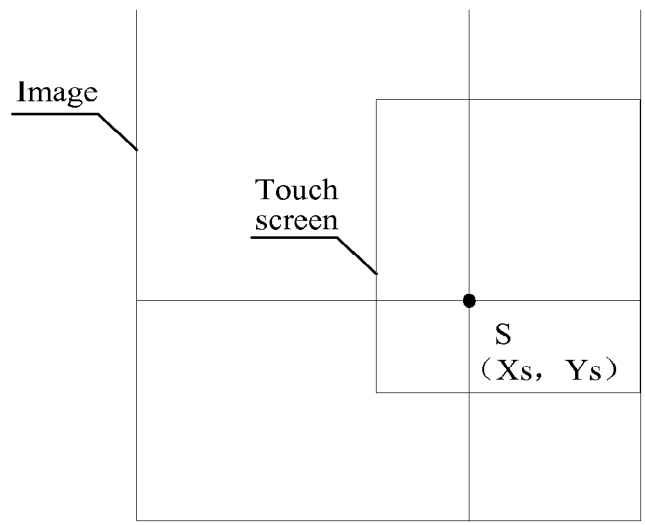
FIG. 17 is a schematic diagram in which a right boundary of an image overlaps with a right boundary of a touch screen according to exemplary Embodiment 3 of the present invention.
Figure 18:
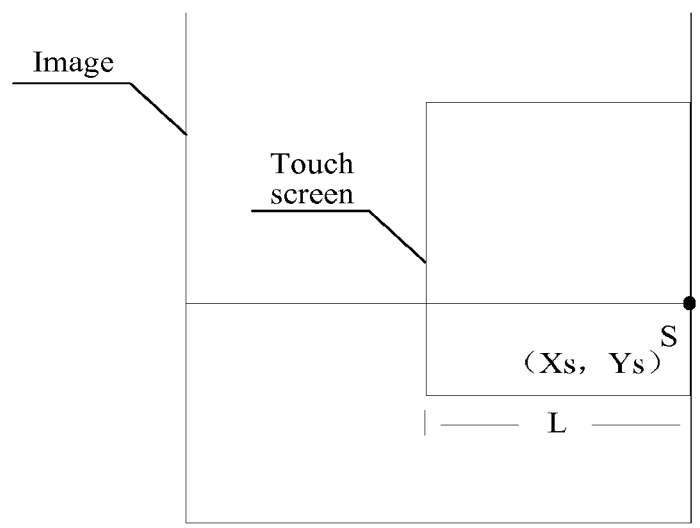
FIG. 18 is a schematic diagram of varying a position at which a user touches a touch screen, when a right boundary of an image overlaps with a right boundary of the touch screen according to exemplary Embodiment 3 of the present invention.
Figure 19:
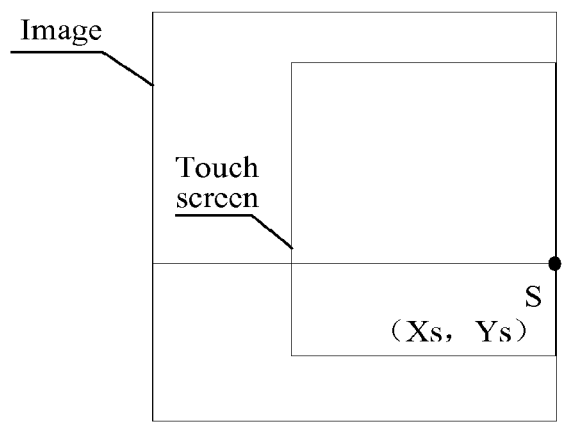
FIG. 19 is a schematic diagram of zooming out an image when a right boundary of the image overlaps with a right boundary of a touch screen according to exemplary Embodiment 3 of the present invention.

For example, referring to FIG. 17, the right boundary of the image currently taken by the camera device overlaps with the right boundary of the touch screen of the camera device, and a horizontal coordinate Xs of the position S where the finger of the user touches the touch screen of the camera device is set as a width L of the touch screen of the camera device. Referring to FIG. 18, the coordinates (Xs, Ys) of the position S where the finger of the user touches the touch screen of the camera device are obtained to be (L, Ys). The image currently taken by the camera device is zoomed out according to the image zooming multiple and by using the position S where the finger of the user touches the touch screen of the camera device as a center, to obtain a zoomed-out image shown in FIG. 19.

If an upper boundary of the image currently taken by the camera device overlaps with an upper boundary of the touch screen of the camera device, a vertical coordinate of the position at which the finger of the user touches the touch screen of the camera device is set to zero, and the image currently taken by camera device is zoomed out according to the image zooming multiple and by using the position at which the finger of the user touches the touch screen of the camera device as a center.

Figure 20:
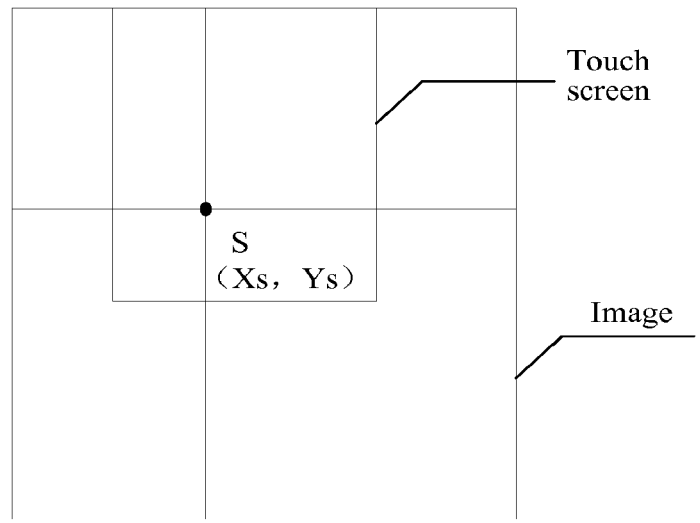
FIG. 20 is a schematic diagram in which an upper boundary of an image overlaps with an upper boundary of a touch screen according to exemplary Embodiment 3 of the present invention.
Figure 21:
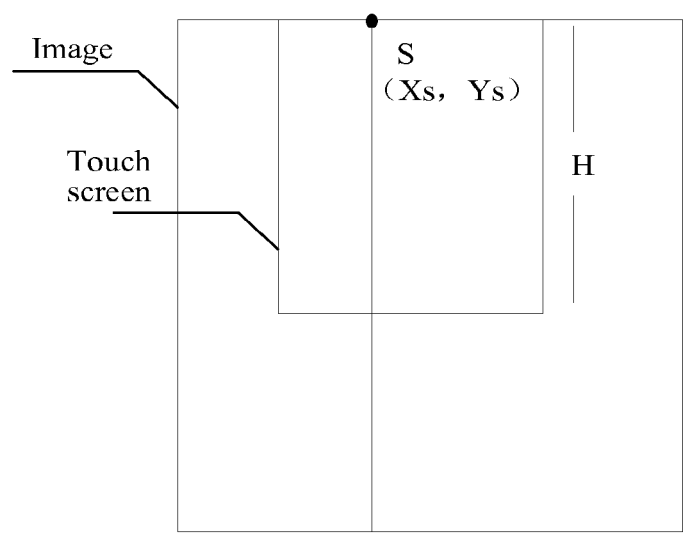
FIG. 21 is a schematic diagram of varying a position at which a user touches a touch screen, when an upper boundary of an image overlaps with an upper boundary of the touch screen according to exemplary Embodiment 3 of the present invention.
Figure 22:
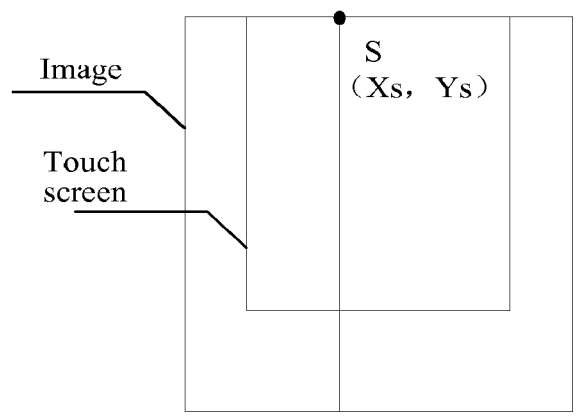
FIG. 22 is a schematic diagram of zooming out an image when an upper boundary of the image overlaps with an upper boundary of a touch screen according to exemplary Embodiment 3 of the present invention.

For example, referring to FIG. 20, the upper boundary of the image currently taken by the camera device overlaps with the upper boundary of the touch screen of the camera device, and a vertical coordinate Ys of the position S where the finger of the user touches the touch screen of the camera device is set to zero. Referring to FIG. 21, the coordinates (Xs, Ys) of the position S where the finger of the user touches the touch screen of the camera device are obtained to be (Xs, 0). The image currently taken by the camera device is zoomed out according to the image zooming multiple and by using the position S where the finger of the user touches the touch screen of the camera device as a center, to obtain a zoomed-out image shown in FIG. 22.

If a lower boundary of the image currently taken by the camera device overlaps with a lower boundary of the touch screen of the camera device, a vertical coordinate of the position at which the finger of the user touches the touch screen of the camera device is set as a height of the touch screen of the camera device, and the image currently taken by camera device is zoomed out according to the image zooming multiple and by using the position at which the finger of the user touches the touch screen of the camera device as a center.

Figure 23:
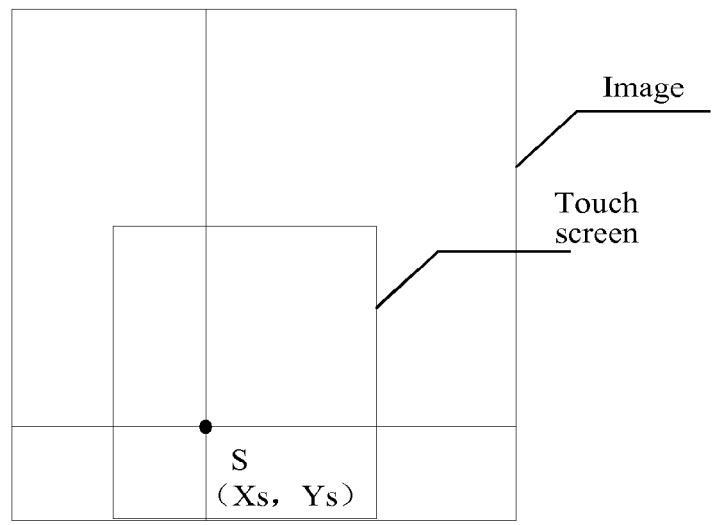
FIG. 23 is a schematic diagram in which a lower boundary of an image overlaps with a lower boundary of a touch screen according to exemplary Embodiment 3 of the present invention.
Figure 24:
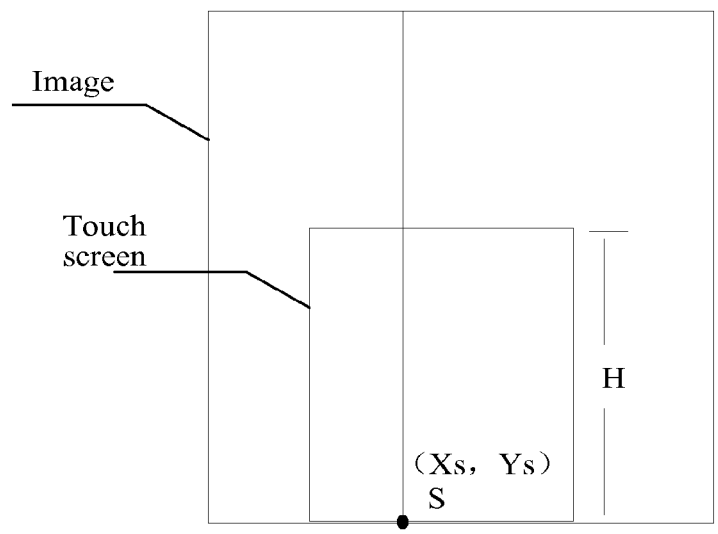
FIG. 24 is a schematic diagram of varying a position at which a user touches a touch screen, when a lower boundary of an image overlaps with a lower boundary of the touch screen according to exemplary Embodiment 3 of the present invention.
Figure 25:
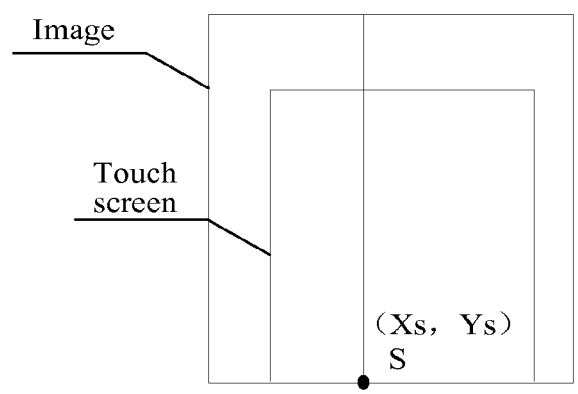
FIG. 25 is a schematic diagram of zooming out an image when a lower boundary of the image overlaps with a lower boundary of a touch screen according to exemplary Embodiment 3 of the present invention.

For example, referring to FIG. 23, the lower boundary of the image currently taken by the camera device overlaps with the lower boundary of the touch screen of the camera device, and a vertical coordinate Ys of the position S where the finger of the user touches the touch screen of the camera device is set as a height H of the touch screen of the camera device. Referring to FIG. 24, the coordinates (Xs, Ys) of the position S where the finger of the user touches the touch screen of the camera device are obtained to be (Xs, H). The image currently taken by the camera device is zoomed out according to the image zooming multiple and by using the position S where the finger of the user touches the touch screen of the camera device as a center, to obtain a zoomed-out image shown in FIG. 25.

When a boundary of the image currently taken by the camera device overlaps with a boundary of the touch screen of the camera device, if the image currently taken by camera device is zoomed out according to the image zooming multiple and by directly using the position at which the finger of the user touches the touch screen of the camera device as a center, a problem that a black area appears in the touch screen of the camera device occurs. However, in this embodiment of the present invention, the coordinates of the position at which the finger of the user touches the touch screen of the camera device are varied first, and then the image currently taken by camera device is zoomed out according to the image zooming multiple and by using the varied position at which the finger of the user touches the touch screen of the camera device as a center, so that a side, of the image currently taken by the camera device, that overlaps with a boundary of the touch screen of the camera device, is not zoomed, thereby avoiding the foregoing problem.

When origin coordinates of a coordinate system that exists in the camera device are at a top-right corner of the touch screen of the camera device, that the image taken by camera device is zoomed according to the image zooming multiple and by using the position at which the finger of the user touches the touch screen of the camera device as a center may specifically be:

If a left boundary of the image currently taken by the camera device overlaps with a left boundary of the touch screen of the camera device, a horizontal coordinate of the position at which the finger of the user touches the touch screen of the camera device is set as a width of the touch screen of the camera device, and the image currently taken by camera device is zoomed out according to the image zooming multiple and by using the position at which the finger of the user touches the touch screen of the camera device as a center.

For example, referring to FIG. 14, the left boundary of the image currently taken by the camera device overlaps with the left boundary of the touch screen of the camera device, and a horizontal coordinate Xs of the position S where the finger of the user touches the touch screen of the camera device is set as a width L of the touch screen of the camera device. Referring to FIG. 15, the coordinates (Xs, Ys) of the position S where the finger of the user touches the touch screen of the camera device are obtained to be (L, Ys). The image currently taken by the camera device is zoomed out according to the image zooming multiple and by using the position S where the finger of the user touches the touch screen of the camera device as a center, to obtain a zoomed-out image shown in FIG. 16.

If a right boundary of the image currently taken by the camera device overlaps with a right boundary of the touch screen of the camera device, a horizontal coordinate of the position at which the finger of the user touches the touch screen of the camera device is set to zero, and the image currently taken by camera device is zoomed out according to the image zooming multiple and by using the position at which the finger of the user touches the touch screen of the camera device as a center.

For example, referring to FIG. 17, the right boundary of the image currently taken by the camera device overlaps with the right boundary of the touch screen of the camera device, and a horizontal coordinate Xs of the position S where the finger of the user touches the touch screen of the camera device is set to be zero. Referring to FIG. 18, the coordinates (Xs, Ys) of the position S where the finger of the user touches the touch screen of the camera device are obtained to be (0, Ys). The image currently taken by the camera device is zoomed out according to the image zooming multiple and by using the position S where the finger of the user touches the touch screen of the camera device as a center, to obtain a zoomed-out image shown in FIG. 19.

If an upper boundary of the image currently taken by the camera device overlaps with an upper boundary of the touch screen of the camera device, a vertical coordinate of the position at which the finger of the user touches the touch screen of the camera device is set to zero, and the image currently taken by camera device is zoomed out according to the image zooming multiple and by using the position at which the finger of the user touches the touch screen of the camera device as a center.

For example, referring to FIG. 20, the upper boundary of the image currently taken by the camera device overlaps with the upper boundary of the touch screen of the camera device, and a vertical coordinate Ys of the position S where the finger of the user touches the touch screen of the camera device is set to zero. Referring to FIG. 21, the coordinates (Xs, Ys) of the position S where the finger of the user touches the touch screen of the camera device are obtained to be (Xs, 0). The image currently taken by the camera device is zoomed out according to the image zooming multiple and by using the position S where the finger of the user touches the touch screen of the camera device as a center, to obtain a zoomed-out image shown in FIG. 22.

If a lower boundary of the image currently taken by the camera device overlaps with a lower boundary of the touch screen of the camera device, a vertical coordinate of the position at which the finger of the user touches the touch screen of the camera device is set as a height of the touch screen of the camera device, and the image currently taken by camera device is zoomed out according to the image zooming multiple and by using the position at which the finger of the user touches the touch screen of the camera device as a center.

For example, referring to FIG. 23, the lower boundary of the image currently taken by the camera device overlaps with the lower boundary of the touch screen of the camera device, and a vertical coordinate Ys of the position S where the finger of the user touches the touch screen of the camera device is set as a height H of the touch screen of the camera device. Referring to FIG. 24, the coordinates (Xs, Ys) of the position S where the finger of the user touches the touch screen of the camera device are obtained to be (Xs, H). The image currently taken by the camera device is zoomed out according to the image zooming multiple and by using the position S where the finger of the user touches the touch screen of the camera device as a center, to obtain a zoomed-out image shown in FIG. 25.

When origin coordinates of a coordinate system that exists in the camera device are at a bottom-left corner of the touch screen of the camera device, that the image taken by camera device is zoomed according to the image zooming multiple and by using the position at which the finger of the user touches the touch screen of the camera device as a center may specifically be:

If a left boundary of the image currently taken by the camera device overlaps with a left boundary of the touch screen of the camera device, a horizontal coordinate of the position at which the finger of the user touches the touch screen of the camera device is set to zero, and the image currently taken by camera device is zoomed out according to the image zooming multiple and by using the position at which the finger of the user touches the touch screen of the camera device as a center.

For example, referring to FIG. 14, the left boundary of the image currently taken by the camera device overlaps with the left boundary of the touch screen of the camera device, and a horizontal coordinate Xs of the position S where the finger of the user touches the touch screen of the camera device is set to zero. Referring to FIG. 15, the coordinates (Xs, Ys) of the position S where the finger of the user touches the touch screen of the camera device are obtained to be (0, Ys). The image currently taken by the camera device is zoomed out according to the image zooming multiple and by using the position S where the finger of the user touches the touch screen of the camera device as a center, to obtain a zoomed-out image shown in FIG. 16.

If a right boundary of the image currently taken by the camera device overlaps with a right boundary of the touch screen of the camera device, a horizontal coordinate of the position at which the finger of the user touches the touch screen of the camera device is set as a width of the touch screen of the camera device, and the image currently taken by camera device is zoomed out according to the image zooming multiple and by using the position at which the finger of the user touches the touch screen of the camera device as a center.

For example, referring to FIG. 17, the right boundary of the image currently taken by the camera device overlaps with the right boundary of the touch screen of the camera device, and a horizontal coordinate Xs of the position S where the finger of the user touches the touch screen of the camera device is set as a width L of the touch screen of the camera device. Referring to FIG. 18, the coordinates (Xs, Ys) of the position S where the finger of the user touches the touch screen of the camera device are obtained to be (L, Ys). The image currently taken by the camera device is zoomed out according to the image zooming multiple and by using the position S where the finger of the user touches the touch screen of the camera device as a center, to obtain a zoomed-out image shown in FIG. 19.

If an upper boundary of the image currently taken by the camera device overlaps with an upper boundary of the touch screen of the camera device, a vertical coordinate of the position at which the finger of the user touches the touch screen of the camera device is set as a height of the touch screen of the camera device, and the image currently taken by camera device is zoomed out according to the image zooming multiple and by using the position at which the finger of the user touches the touch screen of the camera device as a center.

For example, referring to FIG. 20, the upper boundary of the image currently taken by the camera device overlaps with the upper boundary of the touch screen of the camera device, and a vertical coordinate Ys of the position S where the finger of the user touches the touch screen of the camera device is set as a height H of the touch screen of the camera device. Referring to FIG. 21, the coordinates (Xs, Ys) of the position S where the finger of the user touches the touch screen of the camera device are obtained to be (Xs, H). The image currently taken by the camera device is zoomed out according to the image zooming multiple and by using the position S where the finger of the user touches the touch screen of the camera device as a center, to obtain a zoomed-out image shown in FIG. 22.

If a lower boundary of the image currently taken by the camera device overlaps with a lower boundary of the touch screen of the camera device, a vertical coordinate of the position at which the finger of the user touches the touch screen of the camera device is set to zero, and the image currently taken by camera device is zoomed out according to the image zooming multiple and by using the position at which the finger of the user touches the touch screen of the camera device as a center.

For example, referring to FIG. 23, the lower boundary of the image currently taken by the camera device overlaps with the lower boundary of the touch screen of the camera device, and a vertical coordinate Ys of the position S where the finger of the user touches the touch screen of the camera device is set to zero. Referring to FIG. 24, the coordinates (Xs, Ys) of the position S where the finger of the user touches the touch screen of the camera device are obtained to be (Xs, 0). The image currently taken by the camera device is zoomed out according to the image zooming multiple and by using the position S where the finger of the user touches the touch screen of the camera device as a center, to obtain a zoomed-out image shown in FIG. 25.

When origin coordinates of a coordinate system that exists in the camera device are at a bottom-right corner of the touch screen of the camera device, that the image taken by camera device is zoomed according to the image zooming multiple and by using the position at which the finger of the user touches the touch screen of the camera device as a center may specifically be:

If a left boundary of the image currently taken by the camera device overlaps with a left boundary of the touch screen of the camera device, a horizontal coordinate of the position at which the finger of the user touches the touch screen of the camera device is set as a width of the touch screen of the camera device, and the image currently taken by camera device is zoomed out according to the image zooming multiple and by using the position at which the finger of the user touches the touch screen of the camera device as a center.

For example, referring to FIG. 14, the left boundary of the image currently taken by the camera device overlaps with the left boundary of the touch screen of the camera device, and a horizontal coordinate Xs of the position S where the finger of the user touches the touch screen of the camera device is set as a width L of the touch screen of the camera device. Referring to FIG. 15, the coordinates (Xs, Ys) of the position S where the finger of the user touches the touch screen of the camera device are obtained to be (L, Ys). The image currently taken by the camera device is zoomed out according to the image zooming multiple and by using the position S where the finger of the user touches the touch screen of the camera device as a center, to obtain a zoomed-out image shown in FIG. 16.

If a right boundary of the image currently taken by the camera device overlaps with a right boundary of the touch screen of the camera device, a horizontal coordinate of the position at which the finger of the user touches the touch screen of the camera device is set to zero, and the image currently taken by camera device is zoomed out according to the image zooming multiple and by using the position at which the finger of the user touches the touch screen of the camera device as a center.

For example, referring to FIG. 17, the right boundary of the image currently taken by the camera device overlaps with the right boundary of the touch screen of the camera device, and a horizontal coordinate Xs of the position S where the finger of the user touches the touch screen of the camera device is set to zero. Referring to FIG. 18, the coordinates (Xs, Ys) of the position S where the finger of the user touches the touch screen of the camera device are obtained to be (Xs, 0). The image currently taken by the camera device is zoomed out according to the image zooming multiple and by using the position S where the finger of the user touches the touch screen of the camera device as a center, to obtain a zoomed-out image shown in FIG. 19.

If an upper boundary of the image currently taken by the camera device overlaps with an upper boundary of the touch screen of the camera device, a vertical coordinate of the position at which the finger of the user touches the touch screen of the camera device is set as a height of the touch screen of the camera device, and the image currently taken by camera device is zoomed out according to the image zooming multiple and by using the position at which the finger of the user touches the touch screen of the camera device as a center.

For example, referring to FIG. 20, the upper boundary of the image currently taken by the camera device overlaps with the upper boundary of the touch screen of the camera device, and a vertical coordinate Ys of the position S where the finger of the user touches the touch screen of the camera device is set as a height H of the touch screen of the camera device. Referring to FIG. 21, the coordinates (Xs, Ys) of the position S where the finger of the user touches the touch screen of the camera device are obtained to be (Xs, H). The image currently taken by the camera device is zoomed out according to the image zooming multiple and by using the position S where the finger of the user touches the touch screen of the camera device as a center, to obtain a zoomed-out image shown in FIG. 22.

If a lower boundary of the image currently taken by the camera device overlaps with a lower boundary of the touch screen of the camera device, a vertical coordinate of the position at which the finger of the user touches the touch screen of the camera device is set to zero, and the image currently taken by camera device is zoomed out according to the image zooming multiple and by using the position at which the finger of the user touches the touch screen of the camera device as a center.

For example, referring to FIG. 23, the lower boundary of the image currently taken by the camera device overlaps with the lower boundary of the touch screen of the camera device, and a vertical coordinate Ys of the position S where the finger of the user touches the touch screen of the camera device is set to zero. Referring to FIG. 24, the coordinates (Xs, Ys) of the position S where the finger of the user touches the touch screen of the camera device are obtained to be (Xs, 0). The image currently taken by the camera device is zoomed out according to the image zooming multiple and by using the position S where the finger of the user touches the touch screen of the camera device as a center, to obtain a zoomed-out image shown in FIG. 25.

When the first coordinates of the finger of the user currently on the touch screen of the camera device are collected during a next period, go back to Step 302 to start operation, and if it is detected that the finger of the user leaves the touch screen of the camera device, end operation.

In this embodiment of the present invention, when a camera device takes an image, if it is detected that one finger of a user touches a touch screen of the camera device and slides, a distance for which the finger of the user slides on the touch screen of the camera device and a direction in which the finger of the user slides on the touch screen of the camera device are periodically collected, an image zooming multiple is obtained according to the distance for which the finger of the user slides on the touch screen of the camera device and the direction in which the finger of the user slides on the touch screen of the camera device, and the image currently taken by the camera device is zoomed according to the image zooming multiple and by using a position at which the finger of the user touches the touch screen of the camera device as a center, so as to vary a focal length of the camera device. In this way, a user can use one finger of a hand that holds a camera device, to touch and slide on a touch screen of the camera device to vary a focal length of the camera device, thereby improving operation convenience.

Exemplary Embodiment 4

Figure 26:
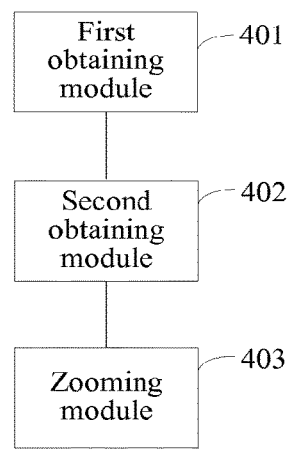
FIG. 26 is a schematic structural diagram of an apparatus for varying a focal length of a camera device according to exemplary Embodiment 4 of the present invention.

As shown in FIG. 26, this embodiment of the present invention provides an apparatus for varying a focal length of a camera device, including: a first obtaining module 401, configured to obtain a position at which one finger of a user touches a touch screen of the camera device; a second obtaining module 402, configured to obtain an image zooming multiple according to a distance for which the finger of the user slides on the touch screen of the camera device and a direction in which the finger of the user slides on the touch screen of the camera device; and a zooming module 403, configured to zoom, according to the image zooming multiple and by using the position at which the finger of the user touches the touch screen of the camera device as a center, an image currently taken by the camera device, so as to vary a focal length of the camera device.

The first obtaining module 402 determines a zooming multiple variation of the image according to the distance, and the zooming module 403 determines, according to the direction, whether the image is zoomed in or zoomed out.

Further, the apparatus further includes: a collecting module, configured to periodically collect, when it is detected that the finger of the user touches the touch screen of the camera device and slides, the distance for which the finger of the user slides on the touch screen of the camera device and the direction in which the finger of the user slides on the touch screen of the camera device.

The collecting module includes: a collecting unit, configured to periodically collect first coordinates of the finger of the user currently on the touch screen of the camera device; and a calculating and determining unit, configured to calculate the distance for which the finger of the user slides on the touch screen of the camera device and determine the direction in which the finger of the user slides on the touch screen of the camera device, according to stored second coordinates and the first coordinates of the finger of the user currently on the touch screen of the camera device.

The second coordinates are coordinates of the finger of the user on the touch screen of the camera device that are collected during a latest period before a current period, or coordinates of the finger of the user on the touch screen of the camera device when the finger of the user just touches the touch screen of the camera device.

Further, the apparatus further includes: an updating module, configured to update the stored second coordinates as the first coordinates of the finger of the user currently on the touch screen of the camera device.

The first obtaining module 402 includes: a first calculating unit, configured to calculate an image zooming multiple variation according to the distance for which the finger of the user slides on the touch screen of the camera device; and a second calculating unit, configured to calculate, if the direction in which the finger of the user slides on the touch screen of the camera device is a preset focal length lengthening direction, a first difference value between an image zooming multiple for current image zooming of the camera device and an upper limit of an image zooming multiple range corresponding to the camera device.

The first obtaining module 402 further includes: a first determining unit, configured to determine, if the first difference value is less than or equal to the image zooming multiple variation, the image zooming multiple as the upper limit of the image zooming multiple range corresponding to the camera device; and a first operation unit, configured to add, if the first difference value is greater than the image zooming multiple variation, the image zooming multiple for current image zooming of the camera device by the image zooming multiple variation, to obtain the image zooming multiple.

The first obtaining module 402 includes: a first calculating unit, configured to calculate an image zooming multiple variation according to the distance for which the finger of the user slides on the touch screen of the camera device; and a third calculating unit, configured to calculate, if the direction in which the finger of the user slides on the touch screen of the camera device is a preset focal length shortening direction, a second difference value between an image zooming multiple for current image zooming of the camera device and a lower limit of an image zooming multiple range corresponding to the camera device.

The first obtaining module 402 further includes: a second determining unit, configured to determine, if the second difference value is less than or equal to the image zooming multiple variation, the image zooming multiple as the lower limit of the image zooming multiple range corresponding to the camera device; and a second operation unit, configured to subtract, if the second difference value is greater than the image zooming multiple variation, the image zooming multiple variation from the image zooming multiple for current image zooming of the camera device, to obtain the image zooming multiple.

The zooming module includes: a first setting unit, configured to set a horizontal coordinate of the position at which the finger of the user touches the touch screen of the camera device to zero or a width of the touch screen of the camera device if a left boundary of the image currently taken by the camera device overlaps with a left boundary of the touch screen of the camera device or a right boundary of the image currently taken by the camera device overlaps with a right boundary of the touch screen of the camera device.

The zooming module further includes: a second setting unit, configured to set a vertical coordinate of the position at which the finger of the user touches the touch screen of the camera device to zero or a height of the touch screen of the camera device if an upper boundary of the image currently taken by the camera device overlaps with an upper boundary of the touch screen of the camera device or a lower boundary of the image currently taken by the camera device overlaps with a lower boundary of the touch screen of the camera device; and a zooming out unit, configured to zoom out, according to the image zooming multiple and by using the position at which the finger of the user touches the touch screen of the camera device as a center, the image currently taken by the camera device.

The first calculating unit is specifically configured to multiply the distance for which the finger of the user slides on the touch screen of the camera device by a preset image zooming coefficient, to obtain the image zooming multiple variation.

In this embodiment of the present invention, when a camera device takes an image, if one finger of a user touches a touch screen of the camera device and slides, a distance for which the finger of the user slides on the touch screen of the camera device and a direction in which the finger of the user slides on the touch screen of the camera device are periodically collected, an image zooming multiple is obtained according to the distance for which the finger of the user slides on the touch screen of the camera device and the direction in which the finger of the user slides on the touch screen of the camera device, and the image currently taken by the camera device is zoomed according to the image zooming multiple and by using a position at which the finger of the user touches the touch screen of the camera device as a center, so as to vary a focal length of the camera device. In this way, a user can use one finger of a hand that holds a camera device, to touch and slide on a touch screen of the camera device to vary a focal length of the camera device, thereby improving operation convenience.

Figure 27:
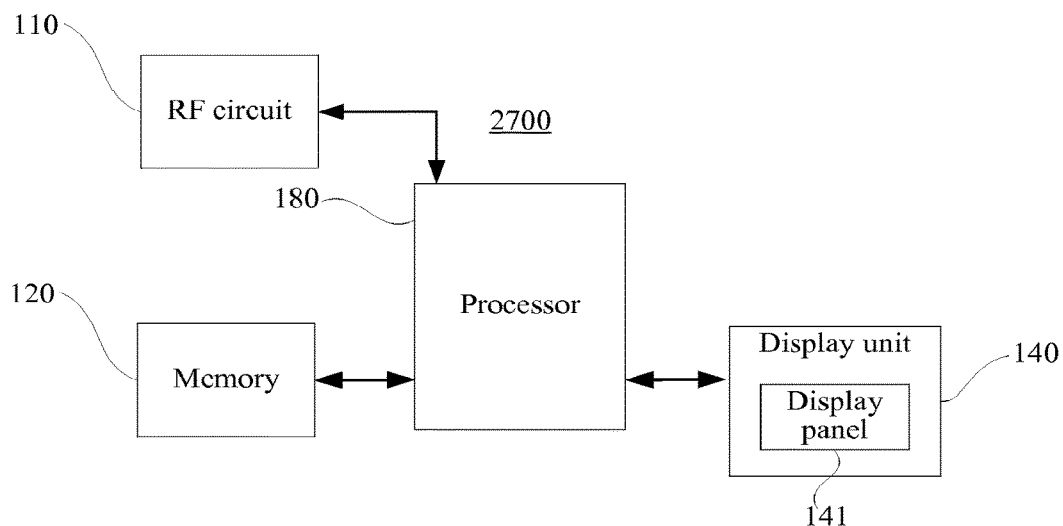
FIG. 27 is a schematic structural diagram of a camera device involved in embodiments of the present invention.

FIG. 27 is a schematic structural diagram of a camera device involved in embodiments of the present invention. The terminal device may be configured to implement the method for varying a focal length of a camera device provided in the foregoing embodiments. Specifically:

A camera device 2700 may include components such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power supply 190. A person skilled in the art may understand that the structure of the terminal device shown in FIG. 27 does not constitute a limitation to the terminal device, and the terminal device may include more components or fewer components than those shown in the figure, or some components may be combined, or a different component deployment may be used.

The RF circuit 110 may be configured to receive and send signals during an information receiving and sending process or a call process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the camera device 2700, and the like. In addition, the memory 120 may include a high speed random access memory, and may also include a non-volatile memory, such as at least one magnetic disk storage device, a flash memory, or another volatile solid-state storage device. Accordingly, the memory 120 may further include a memory controller, so that the processor 180 accesses the memory 120.

The display unit 140 may be configured to display information input by the user or information provided for the user, and various graphical user interfaces of the camera device 2700. The graphical user interfaces may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like.

The processor 180 is a control center of the camera device 2700, and connects to various parts of a mobile phone by using various interfaces and lines. By running or executing the software program and/or module stored in the memory 120, and invoking data stored in the memory 120, the processor 180 performs various functions and data processing of the camera device 2700, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may also not be integrated into the processor 180.

Specifically, in this embodiment, the display unit of the camera device is a touch screen display, and the camera device further includes a memory and one or more program instructions. The one or more program instructions being stored in the memory and configured to be executed by one or more processors. The one or more program instructions include: a position obtaining instruction, a zoom obtaining instruction, a zooming instruction, and/or other instructions according to the methods and apparatus disclosed herein.

The position obtaining instruction is configured to obtain a position at which one finger of a user touches a touch screen of the camera device. The zoom obtaining instruction is configured to obtain an image zooming multiple according to a distance for which the finger of the user slides on the touch screen of the camera device and a direction in which the finger of the user slides on the touch screen of the camera device. The zooming instruction is configured to zoom, according to the image zooming multiple and by using the position at which the finger of the user touches the touch screen of the camera device as a center, an image currently taken by the camera device, so as to vary a focal length of the camera device.

Certainly, the memory further stores program instructions used for executing any one of the foregoing embodiments 1, 2, and 3, which are not described again in this embodiment of the present invention again.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for varying a focal length of a camera device, comprising:

obtaining a position where a single finger of a user first touches a touch screen of the camera device;

when it is detected that the single finger of the user touches the touch screen of the camera device and slides, obtaining a distance and a direction that the single finger of the user slides on the touch screen of the camera device;

obtaining an image zooming multiple according to the distance and the direction that the single finger of the user slides on the touch screen of the camera device; and zooming, according to the image zooming multiple and by using the position on the camera device where the single finger of the user touches the touch screen of the camera device as a center, an image currently taken by the camera device, so as to vary the focal length of the camera device, comprising:
- determining an image zooming multiple variation of the image according to the distance that the single finger of the user slides on the touch screen of the camera device;
- determining whether to zoom in or zoom out the image according to the direction that the single finger of the user slides on the touch screen of the camera device, and at least one of a preset focal length shortening direction or a preset focal length lengthening direction; and
- determining the image zooming multiple of the camera device according to an image zooming multiple for current image zooming of the camera device and at least one of an upper limit or a lower limit of an image zooming multiple range corresponding to the camera device.

2. The method according to claim 1, wherein the obtaining of the distance and the direction that the single finger of the user slides on the touch screen of the camera device comprises:
- periodically collecting first coordinates of the single finger of the user currently on the touch screen of the camera device; and
- calculating the distance that the single finger of the user slides on the touch screen of the camera device and determining the direction that the single finger of the user slides on the touch screen of the camera device, according to stored second coordinates and the first coordinates of the single finger of the user currently on the touch screen of the camera device, wherein:
- the second coordinates are coordinates of the single finger of the user on the touch screen of the camera device that are collected during a latest period before a current period.

3. The method according to claim 1, wherein the obtaining of the distance and the direction that the single finger of the user slides on the touch screen of the camera device comprises:
- periodically collecting first coordinates of the single finger of the user currently on the touch screen of the camera device; and
- calculating the distance that the single finger of the user slides on the touch screen of the camera device and determining the direction that the single finger of the user slides on the touch screen of the camera device, according to stored second coordinates and the first coordinates of the single finger of the user currently on the touch screen of the camera device, wherein:
- the second coordinates are coordinates of the single finger of the user on the touch screen of the camera device when the single finger of the user just touches the touch screen of the camera device.

4. The method according to claim 3, wherein, after calculating the distance that the single finger of the user slides on the touch screen of the camera device and determining the direction that the single finger of the user slides on the touch screen of the camera device, the method further comprises:
- updating the stored second coordinates as the first coordinates of the single finger of the user currently on the touch screen of the camera device.

5. The method according to claim 1, wherein the obtaining of the image zooming multiple according to the distance and the direction that the single finger of the user slides on the touch screen of the camera device comprises:
- calculating, if the direction that the single finger of the user slides on the touch screen of the camera device is the preset focal length lengthening direction, a first difference value between the image zooming multiple for current image zooming of the camera device and the upper limit of an image zooming multiple range corresponding to the camera device;
- if the first difference value is less than or equal to the image zooming multiple variation, determining the image zooming multiple as the upper limit of the image zooming multiple range corresponding to the camera device; and
- adding, if the first difference value is greater than the image zooming multiple variation, the image zooming multiple for current image zooming of the camera device by the image zooming multiple variation, to obtain the image zooming multiple.

6. The method according to claim 1, wherein the obtaining of the image zooming multiple according to the distance and the direction that the single finger of the user slides on the touch screen of the camera device comprises:
- calculating, if the direction that the single finger of the user slides on the touch screen of the camera device is a preset focal length shortening direction, a second difference value between the image zooming multiple for current image zooming of the camera device and the lower limit of an image zooming multiple range corresponding to the camera device;
- determining, if the second difference value is less than or equal to the image zooming multiple variation, the image zooming multiple as the lower limit of the image zooming multiple range corresponding to the camera device; and
- subtracting, if the second difference value is greater than the image zooming multiple variation, the image zooming multiple variation from the image zooming multiple for current image zooming of the camera device, to obtain the image zooming multiple.

7. The method according to claim 6, wherein the zooming, according to the image zooming multiple and by using the position on the camera device where the single finger of the user touches the touch screen of the camera device as the center, of the image currently taken by the camera device comprises:
- setting a horizontal coordinate of the position where the single finger of the user touches the touch screen of the camera device as zero or as a width of the touch screen of the camera device, if a left boundary of the image currently taken by the camera device overlaps with a left boundary of the touch screen of the camera device or a right boundary of the image currently taken by the camera device overlaps with a right boundary of the touch screen of the camera device;

setting a vertical coordinate of the position where the single finger of the user touches the touch screen of the camera device as zero or as a height of the touch screen of the camera device, if an upper boundary of the image currently taken by the camera device overlaps with an upper boundary of the touch screen of the camera device or a lower boundary of the image currently taken by the camera device overlaps with a lower boundary of the touch screen of the camera device; and zooming out, according to the image zooming multiple and by using the position where the single finger of the user touches the touch screen of the camera device as the center, the image currently taken by the camera device.

8. The method according to claim 1, further comprising:
multiplying the distance that the single finger of the user slides on the touch screen of the camera device by a preset image zooming coefficient, to obtain the image zooming multiple variation.

9. An apparatus for varying a focal length of a camera device, comprising:
a memory; and
a processor coupled to the memory, wherein the processor is configured for:
obtaining a position where a single finger of a user touches a touch screen of the camera device;
when it is detected that the single finger of the user touches the touch screen of the camera device and slides, obtaining a distance and a direction that the single finger of the user slides on the touch screen of the camera device;
obtaining an image zooming multiple according to the distance and the direction that the single finger of the user slides on the touch screen of the camera device; and
zooming, according to the image zooming multiple and by using the position on the camera device where the single finger of the user touches the touch screen of the camera device as a center, an image currently taken by the camera device, so as to vary the focal length of the camera device, comprising:
determining an image zooming multiple variation of the image according to the distance that the single finger of the user slides on the touch screen of the camera device;
determining whether to zoom in or zoom out the image according to the direction that the single finger of the user slides on the touch screen of the camera device, and at least one of a preset focal length shortening direction or a preset focal length lengthening direction; and
determining the image zooming multiple of the camera device according to an image zooming multiple for current image zooming of the camera device and at least one of an upper limit or a lower limit of an image zooming multiple range corresponding to the camera device.

10. The apparatus according to claim 9, wherein the obtaining of the distance and the direction that the single finger of the user slides on the touch screen of the camera device comprises:
periodically collecting first coordinates of the single finger of the user currently on the touch screen of the camera device; and
calculating the distance that the single finger of the user slides on the touch screen of the camera device and determining the direction that the single finger of the user slides on the touch screen of the camera device, according to stored second coordinates and the first coordinates of the single finger of the user currently on the touch screen of the camera device, wherein:
the second coordinates are coordinates of the single finger of the user on the touch screen of the camera device that are collected during a latest period before a current period.

11. The apparatus according to claim 9, wherein the obtaining of the distance and the direction that the single finger of the user slides on the touch screen of the camera device comprises:
periodically collecting first coordinates of the single finger of the user currently on the touch screen of the camera device; and
calculating the distance that the single finger of the user slides on the touch screen of the camera device and determining the direction that the single finger of the user slides on the touch screen of the camera device, according to stored second coordinates and the first coordinates of the single finger of the user currently on the touch screen of the camera device, wherein:
the second coordinates are coordinates of the single finger of the user on the touch screen of the camera device when the single finger of the user just touches the touch screen of the camera device.

12. The apparatus according to claim 11, wherein the processor is further configured for:
updating the stored second coordinates as the first coordinates of the single finger of the user currently on the touch screen of the camera device.

13. The apparatus according to claim 9, wherein the obtaining of the image zooming multiple according to the distance and the direction that the single finger of the user slides on the touch screen of the camera device comprises:
calculating, if the direction that the single finger of the user slides on the touch screen of the camera device is the preset focal length lengthening direction, a first difference value between the image zooming multiple for current image zooming of the camera device and the upper limit of an image zooming multiple range corresponding to the camera device;
if the first difference value is less than or equal to the image zooming multiple variation, determining the image zooming multiple as the upper limit of the image zooming multiple range corresponding to the camera device; and
adding, if the first difference value is greater than the image zooming multiple variation, the image zooming multiple for current image zooming of the camera device by the image zooming multiple variation, to obtain the image zooming multiple.

14. The apparatus according to claim 9, wherein the obtaining of the image zooming multiple according to the distance and the direction that the single finger of the user slides on the touch screen of the camera device comprises:
calculating, if the direction that the single finger of the user slides on the touch screen of the camera device is a preset focal length shortening direction, a second difference value between the image zooming multiple for current image zooming of the camera device and the lower limit of an image zooming multiple range corresponding to the camera device;

determining, if the second difference value is less than or equal to the image zooming multiple variation, the image zooming multiple as the lower limit of the image zooming multiple range corresponding to the camera device; and subtracting, if the second difference value is greater than the image zooming multiple variation, the image zooming multiple variation from the image zooming multiple for current image zooming of the camera device, to obtain the image zooming multiple.

15. The apparatus according to claim 13, wherein the zooming, according to the image zooming multiple and by using the position on the camera device where the single finger of the user touches the touch screen of the camera device as the center, of the image currently taken by the camera device comprises:

setting a horizontal coordinate of the position where the single finger of the user touches the touch screen of the camera device as zero or as a width of the touch screen of the camera device, if a left boundary of the image currently taken by the camera device overlaps with a left boundary of the touch screen of the camera device or a right boundary of the image currently taken by the camera device overlaps with a right boundary of the touch screen of the camera device;

setting a vertical coordinate of the position where the single finger of the user touches the touch screen of the camera device as zero or as a height of the touch screen of the camera device, if an upper boundary of the image currently taken by the camera device overlaps with an upper boundary of the touch screen of the camera device or a lower boundary of the image currently taken by the camera device overlaps with a lower boundary of the touch screen of the camera device; and zooming out, according to the image zooming multiple and by using the position where the single finger of the user touches the touch screen of the camera device as the center, the image currently taken by the camera device.

16. The apparatus according to claim 9, wherein the processor is further configured for:

multiplying the distance that the single finger of the user slides on the touch screen of the camera device by a preset image zooming coefficient, to obtain the image zooming multiple variation.

17. A non-transitory computer-readable storage medium storing computer-executable program that, when being executed by a processor, implementing a method for varying a focal length of a camera device, the method comprising:

obtaining a position where a single finger of a user touches a touch screen of the camera device;

when it is detected that the single finger of the user touches the touch screen of the camera device and slides, obtaining a distance and a direction that the single finger of the user slides on the touch screen of the camera device;

obtaining an image zooming multiple according to the distance and the direction that the single finger of the user slides on the touch screen of the camera device; and zooming, according to the image zooming multiple and by using the position on the camera device where the single finger of the user touches the touch screen of the camera device as a center, an image currently taken by the camera device, so as to vary the focal length of the camera device, comprising:

determining an image zooming multiple variation of the image according to the distance that the single finger of the user slides on the touch screen of the camera device;

determining whether to zoom in or zoom out the image according to the direction that the single finger of the user slides on the touch screen of the camera device, and at least one of a preset focal length shortening direction or a preset focal length lengthening direction; and determining the image zooming multiple of the camera device according to an image zooming multiple for current image zooming of the camera device and at least one of an upper limit or a lower limit of an image zooming multiple range corresponding to the camera device.

* * * * *